(12) United States Patent
Woodworth

(10) Patent No.: US 6,470,913 B1
(45) Date of Patent: Oct. 29, 2002

(54) BALANCED ROTARY SERVOVALVE

(76) Inventor: Raymond D. Woodworth, 2 Honeysuckle, Irvine, CA (US) 92614

( * ) Notice: Subject to any disclaimer, the term of this patent is extended or adjusted under 35 U.S.C. 154(b) by 0 days.

(21) Appl. No.: 09/595,997

(22) Filed: Jun. 19, 2000

Related U.S. Application Data (63) Continuation-in-part of application No. 09/430,880, filed on Nov. 1, 1999, now Pat. No. 6,269,838.
(60) Provisional application No. 60/113,165, filed on Dec. 22, 1998.

(51) Int. Cl.[7] .................. F16K 11/085; F16K 39/04
(52) U.S. Cl. .................... 137/625.23; 251/283
(58) Field of Search .............. 137/625.21, 625.22, 137/625.23, 625.24, 625.47; 251/283

(56) References Cited

U.S. PATENT DOCUMENTS

| | | | | |
|---|---|---|---|---|
| 3,504,706 A | * | 4/1970 | Schmitz | 251/283 X |
| 3,747,639 A | * | 7/1973 | Eickmann | 137/625.24 |
| 3,774,634 A | * | 11/1973 | Bonney | 251/283 X |
| 4,143,676 A | | 3/1979 | Ivony et al. | |
| 4,177,834 A | * | 12/1979 | Bonney | 137/625.23 |
| 4,479,512 A | | 10/1984 | Ohrendorf et al. | |
| 4,658,859 A | * | 4/1987 | Backe et al. | 137/625.23 |
| 4,794,845 A | | 1/1989 | Vick | |
| 5,020,417 A | | 6/1991 | Weyer | |
| 5,301,922 A | * | 4/1994 | Hayasaka | 251/283 |
| 5,467,800 A | * | 11/1995 | Sallas | 137/625.23 X |
| 5,597,014 A | | 1/1997 | Vick | |
| 5,868,165 A | | 2/1999 | Tranovich | |

* cited by examiner

Primary Examiner—John Rivell
(74) Attorney, Agent, or Firm—Charles H. Thomas (57) ABSTRACT

A rotary servovalve is constructed with a cylindrical annular housing and a cylindrical valve element rotatable therewithin. The valve housing has at least two inlet orifices, at least two outlet orifices, at least two first fluid transfer control orifices, and at least two second fluid transfer control orifices. At least two orifices of each type are located on opposite sides of the valve housing from each other. Preferably there is a first end orifice, a central orifice, and a second end orifice of each type. The end orifices of each type are angularly and longitudinally aligned with each other and are angularly offset 180 degrees from a central orifice of the same type. The end orifices of each type have an area equal to one-half the area of the central orifice of the same type and are equally spaced in opposite longitudinal directions from the central orifice of the same type. An imbalance of fluid forces within the servovalve mechanism is thereby avoided, both in a direction perpendicular to the valve axis and in planes passing through and containing the valve axis. By eliminating force imbalances within the valve in high-pressure applications the electrical current requirement and the mass of the components required for the driving motor or rotory solenoid that operates the valve are reduced.

10 Claims, 4 Drawing Sheets

Fig. 5 — LEFT MOTION

Fig. 4 — RIGHT MOTION

Fig. 3 — LOCKED CYLINDER NO MOTION $$\frac{FORCE(U)}{2} + \frac{FORCE(L)}{2} = FORCE(M)$$

BALANCED ROTARY SERVOVALVE

The present application is a continuation in part of U.S. application Ser. No. 09/430,880 filed Nov. 1, 1999, now U.S. Pat. No. 6,269,838 which claims benefit of provisional application 60/113,165 filed Dec. 22, 1998.

BACKGROUND OF THE INVENTION

1. Field of the Invention

The present invention relates to rotary servovalves, and in particular to high speed rotary servovalves, used to control the flow of fluids under high-pressure, particularly liquids.

2. Description of the Prior Art

Many different mechanical and electrical servovalve systems have been employed for controlling fluid flow in industrial and manufacturing environments, as well as in other applications. Fluid servovalve control systems which require precise and highly responsive control are employed in a multitude of widely varying applications, including the control of robots, the operations of presses for manufacturing rubber and plastic parts, the control of tensioning devices in the paper industry, automotive vehicle and parts manufacturing, petroleum refining operations, and numerous other applications.

In many of the applications in which servo control valve systems are utilized, pressurized fluid is typically provided from a high pressure source and transmitted through a load from which the fluid is then exhausted to a low pressure reservoir. The load may, for example, take the form of a double-acting piston operating within a cylinder. The transfer of fluid from one side of the piston to the other within the cylinder causes the piston to move some mechanism to which it is connected.

In a conventional rotary servovalve for the control of fluid flow, the fluid enters the valve housing at a single inlet port, and exits the valve housing to the load through a single first fluid transfer control port. Fluid from the load reenters the valve housing through a single second fluid transfer control port and exits the valve housing from a single outlet port. Flow through the valve is controlled by the position of the movable valve element which directs flow from the inlet port to the alternative fluid transfer control ports. The flow to the outlet port of the valve housing is to a fluid reservoir, which is maintained at a reduced pressure from the pressure of the fluid source. Consequently, the pressure within the flow passage through the valve leading from the high pressure fluid source is greater than pressure within the flow passage in the valve leading to the fluid reservoir.

Since the fluid flow passageway within the valve which conducts fluid from the high pressure fluid source is typically located on the opposite side of the valve from the fluid passageway that conducts fluid to the fluid reservoir, there is an imbalance in internal pressure within a conventional rotary fluid valve. The high pressure imbalance within the valve produces a bending moment on the movable valve element that must be overcome in order to rotate the valve element. As the requirement for torque to overcome this bending load increases, so does the mass of the components of the driving motor or rotary solenoid required to drive the servovalve in rotation.

Force balancing becomes significant and necessary when large operating supply pressures, for example on the order of 5000 psi, are used. Forces of this magnitude often exist in high-pressure hydraulic applications. With a conventional rotary valve, an extremely large, high inertia rotary solenoid is needed to overcome the unbalanced forces that occur. This results in a slower response and a need for greater operating energy in the solenoid actuator for the solenoid operated rotary valve.

SUMMARY OF THE INVENTION

The present invention is a servovalve upon which the fluid forces are balanced due to the port arrangements with which the valve is constructed. In a conventional rotary servovalve having a single radial inlet port in the valve housing, the high pressure of fluid entering the port acts on the rotatable member within the valve housing to press it against the opposite wall of the valve housing. This force imbalance creates a greater friction within the valve and necessitates the use of a higher torque motor than would otherwise be necessary to operate the valve if the valve were properly balanced.

In the present invention the force imbalance within the valve is virtually eliminated. This is achieved by providing the valve housing with at least a pair of inlet ports and at least a pair of outlet ports. At least two of the inlet ports are located on opposite sides of the valve housing angularly displaced one hundred eighty degrees from each other. Similarly, at least two of the outlet ports are located on opposite sides of the valve housing angularly displaced one hundred eighty degrees from each other. By necessity, the inlet valve ports must be longitudinally offset from each other and the outlet valve ports must be longitudinally offset from each other so as not to interfere with the other ports in the valve. Corresponding sets of first and second fluid control ports are likewise provided in the valve housing. At least two of the fluid control ports within each set are similarly angularly displaced one hundred eighty degrees from each other and are longitudinally offset from each other in the valve housing.

In a valve in which the valve housing has a pair of inlet ports and a pair of outlet ports, the rotary element of the valve is likewise provided with a pair of flow channels or passageways for connecting each set of valve ports. The flow channels in each pair of flow channels are laterally spaced from each other and the pairs of flow channels are longitudinally offset from each other on the movable valve element. As a consequence, pairs of flow channels are defined in which the flow channels in each pair conduct fluid through the valve in opposite directions from each other. Therefore, the forces within the valve are balanced, regardless of the direction of fluid flow, the extent to which the ports are open, and even under no flow conditions. As a result, less torque and, therefore, less massive components in the rotary solenoid are required in order to operate the rotary valve.

By reducing the mass of the rotary solenoid components, the inertia of the rotary solenoid is also reduced. Reduction in valve inertia results in an increase in the frequency bandwidth of responsiveness of the rotary solenoid to electrical input signals. An increase in frequency bandwidth produces a much faster response time of the rotary solenoid, and hence the servovalve, to electrical input signals that operate the solenoid.

In a preferred embodiment of the present invention the rotary servovalve is also balanced not only with respect to forces acting laterally in planes perpendicular to the valve axis, but also with respect to forces acting in planes passing through and containing the valve axis. This eliminates unbalanced forces that otherwise act evenly along the length of the rotatable valve element to exert a moment of torque that would tend to push one end of the rotatable valve element against one wall of the housing and the opposite end of the valve element along a diametrically opposite wall of the housing. Longitudinal torque imbalance along the length of the valve is avoided by providing sets of inlet and outlet ports in the valve housing and corresponding passageways through the rotatable valve element on diametrically opposite sides thereof.

To alleviate the rotational moments produced by rotational forces acting on the rotatable valve element of the invention even when the lateral forces are balanced, a valve configuration is adopted which achieves both lateral and longitudinal rotational force balancing. This is accomplished by providing a pair of diametrically opposed central valve ports each having a cross-sectional area twice that of the area of each opening in upper and lower sets of valve ports. The areas of the upper and lower valve ports are equal to each other. Also, the upper and lower valve ports are spaced equal distances from the central valve ports.

In one broad aspect the present invention may be defined as an improvement in a rotary servovalve system in which fluid is directed through an inlet port, an outlet port, a first fluid control port, and a second fluid control port in a valve housing as directed by a movable valve gate element. The valve gate element is rotatable within a housing in opposite directions of angular rotation from a position prohibiting fluid flow through any of the ports to alternative positions permitting fluid flow in alternative opposite directions through each of the first and second fluid control ports. According to the improvement of the invention a plurality of each of the foregoing ports are provided. At least two of each of the different types of ports are located on opposite sides of the valve housing from each other. The ports are located in the valve housing so offsetting longitudinal bending forces on the movable valve element are created by fluid pressure within the valve.

In a preferred embodiment the invention may be considered to be an improvement in a rotary valve including a hollow cylindrical housing defining a longitudinal axis and having inlet and outlet ports and defined therethrough, and a valve core of cylindrical configuration having transverse passageways defined therethrough and rotatably mounted within the valve housing. According to the improvement of the invention the ports are aligned on the valve housing and the passageways are alignable with the ports by rotation of the valve core within the housing so that rotational bending moments upon the valve core produced by fluid pressure in the passageways are balanced at all times.

In a further preferred rotary valve according to the invention the valve housing and the valve core both have first and second ends and the ports are comprised of a first end inlet port, a second end inlet port, a central inlet port, a first end outlet port, a second end outlet port, and a central outlet port. The end inlet and outlet ports are each equal in area to each other and are each half the area of each of the central ports. The first end inlet port, the central outlet port and the second end inlet port are angularly aligned with each other and the central outlet port lies midway between the end inlet ports in a longitudinal direction. The first end outlet port, the central inlet port and the second end outlet port are angularly aligned with each other, and the central inlet port lies midway between the end outlet ports. The first and second end inlet ports are angularly displaced 180 degrees from the first and second end outlet ports and the central inlet port is angularly displaced 180 degrees from the central outlet port. Preferably, the first and second end inlet ports are respectively located diametrically opposite the first and second end outlet ports. Preferably also, the ports are rectangular in cross-section and are equal in angular width.

The invention may be described with greater clarity and particularity by reference to the accompanying drawings.

DESCRIPTION OF THE EMBODIMENT

Figure 1:
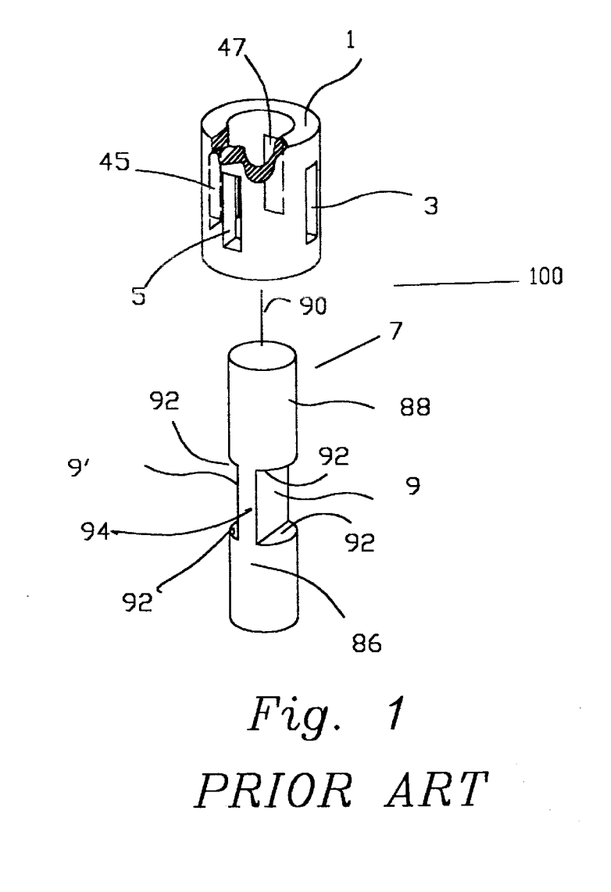
FIG. 1 is an exploded perspective detail illustrating the valve and valve housing employed in a conventional, prior art rotary servovalve.
Figure 2:
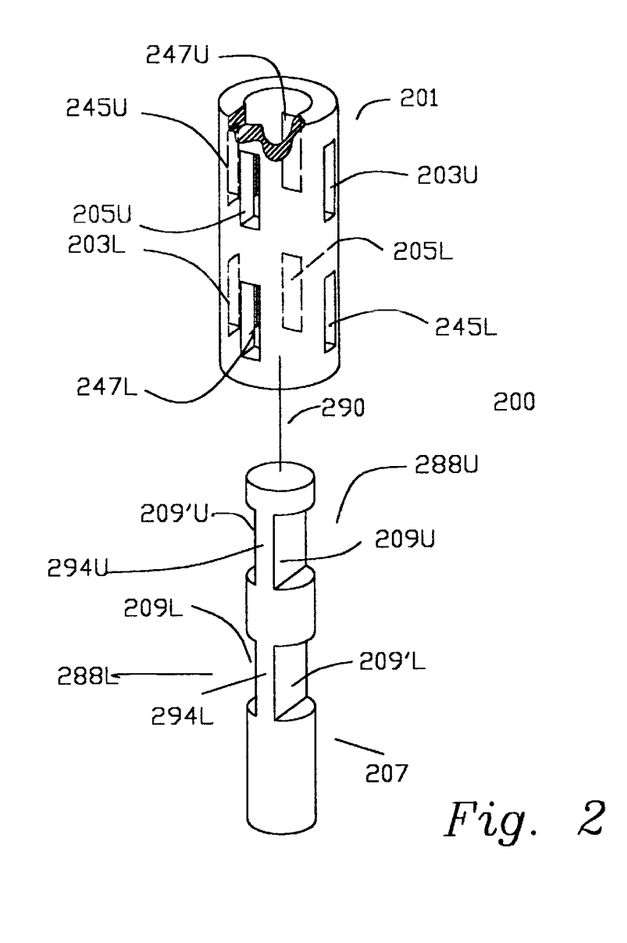
FIG. 2 is an exploded perspective detail illustrating one embodiment of a valve and valve housing according to the present invention which may be employed in place of the valve and valve housing shown in FIG. 1.

FIG. 1 is a diagrammatic illustration of the mechanical components of a rotary servovalve 100 which may be utilized in a rotary solenoid actuated system as illustrated and described in U.S. patent application Ser. No. 09/430,880 filed Nov. 1, 1999, which application is incorporated herein by reference in its entirety. FIG. 2 is a diagrammatic illustration of the mechanical components of one embodiment of a servovalve according to the present invention which may be used in place of the valve shown in FIG. 1.

FIG. 1 illustrates the movable valve gate element 7 and the valve housing sleeve 1 (partially broken away) of a conventional rotary servovalve 100 in enlarged detail. The valve housing sleeve 1 is formed of hardened steel and contains four longitudinally elongated, precision, rectangular shaped fluid passageways or openings 3, 5, 45, and 47. The valve housing sleeve 1 of the rotary valve 100 has a single inlet orifice 47, a single outlet orifice 5, a single first fluid transfer orifice 45, and a single second fluid transfer orifice 3.

The servovalve 100 also includes a bidirectional, rotatable valve gate element 7 that is located radially within the valve housing sleeve 1. The rotatable valve gate element 7 has a generally cylindrical configuration. The lower end 86 of the rotatable valve element 7 is formed as a cylindrical valve stem. The upper end 88 forms a gate portion of the valve gate element 7. The gate portion 88 of the movable valve gate element 7 is formed with a set of planar, mutually parallel, longitudinally oriented, rectangular-shaped, flow-directing faces 9 and 9'. The flow-directing faces 9 and 9' are oriented in mutually parallel alignment with each other and parallel to and equidistant from the axis of rotation 90 of the movable valve gate element 7.

The flow-directing faces 9 and 9' are formed by milling out notches or slots from diametrically opposites sides of the upper end 88 of the movable valve gate element 7 so that the transverse ledge surfaces 92 above and beneath the flow-directing faces 9 and 9' all reside in planes perpendicular to the axis of rotation 90. All of the circular segment-shaped ledges 92 are equal to each other in surface area and are the same distance from the axis of rotation 90.

The structure of the movable valve gate element 7 remaining between the flow-directing faces 9 and 9' may be considered to be a web 94. The diametrically opposing, outwardly facing, curved surfaces of the web 94 are of a slightly greater width than the width of the elongated, rectangular openings 3, 5, 45, and 47 in the valve housing sleeve 1 in order to minimize valve overlap.

Depending upon the pressure in the pressurized fluid supply line coupled to the single inlet orifice 47 a significant imbalance of forces on the flow directing faces 9 and 9' of the rotatable valve element 7 may exist. When there is a significant pressure imbalance within the servovalve 100, the forces required to return the web 94 of the servovalve to a null or 0° position are markedly increased. As a consequence, this would require the use of a rotary solenoid of greater size to provide the torque necessary to drive the solenoid armature away from the 0° position. However, the larger the torque required, the greater will be the mass and size of the rotary solenoid that must be used. As the mass of the parts of the rotary solenoid that drives the valve element 7 in rotation increase, inertia also increases and the time responsiveness of the valve 100 to changing inputs on the electrical control lines coupled to it decreases.

A unique system according to one embodiment of the present invention has been devised for obviating and virtually eliminating any lateral force imbalance on the valve components in the rotary servovalve system of the invention. Specifically, and as illustrated in FIG. 2, an improved rotary valve 200 may be used in place of the valve 100. A valve housing sleeve 201 and a movable valve gate element 207 may be substituted in the valve 200 for the valve housing sleeve 1 and movable valve gate element 7 depicted in the valve 100 shown FIG. 1. As shown in FIGS. 2–5, the valve housing sleeve 201 includes an upper and lower set of each of the orifices and each of the gating sections previously described. That is, the valve housing sleeve 201 includes a pair of inlet orifices 247U and 247L (upper and lower), a pair of outlet orifices 205U and 205L, a pair of first fluid transfer control orifices 245U and 245L, and a pair of second fluid transfer control orifices 203U and 203L. The orifices within each pair of orifices are located one hundred eighty degrees opposite each other and are longitudinally offset from each other in the housing sleeve 201.

That is, the lower inlet orifice 247L is located below the level of the upper inlet orifice 247U and on the opposite side of the valve housing sleeve 201, angularly displaced one hundred eighty degrees away from longitudinal or vertical alignment with the upper inlet orifice 247U. Likewise, the lower outlet orifice 205L is located on the opposite side of the housing sleeve 201 from the upper outlet orifice 205U and beneath the level of the upper outlet orifice 205U. The angular displacement of the upper and lower outlet orifices 205U and 205L from each other is likewise one hundred eighty degrees. As a consequence, the lower outlet orifice 205L is located directly beneath and in longitudinal alignment with the upper inlet orifice 247U. Conversely, the lower inlet orifice 247L is located directly beneath and in longitudinal alignment with the upper outlet orifice 205U, as shown in FIG. 2.

In a like manner the upper, first fluid transfer orifice 245U is located on the opposite side of the housing sleeve 201 angularly displaced one hundred eighty degrees from the lower, first fluid transfer orifice 245L. The upper, second fluid transfer orifice 203U is located on the opposite side of the housing sleeve 201 from the lower, second fluid transfer orifice 203L angularly displaced one hundred eighty degrees therefrom. As a consequence, the upper, first fluid transfer orifice 245U is located directly above the lower, second fluid transfer orifice 203L. The upper, second fluid transfer orifice 203U is located directly above the lower first fluid transfer orifice 245L, as illustrated in FIG. 2.

Similarly, the movable valve member 207 has an upper gate section 288U and a lower gate section 288L. The upper gate section 288U is longitudinally aligned with the upper orifices 247U, 205U, 203U, and 245U. Similarly, the lower gate section 288L is longitudinally aligned with the lower orifices 247L, 205L, 203L, and 245L. The upper gate section 288U has a pair of mutually parallel faces 209U and 209'U located equidistant from the axis of rotation 290 of the movable valve member 207. Similarly, the lower gating section 288L has a pair of flow directing faces 209L and 209'L, mutually parallel to each other and located the same distance from the valve axis of rotation 290 as the upper fluid flow directing faces 209U and 209'U. The flow directing faces 209U and 209'L therefore reside in the same vertically oriented plane while the flow directing faces 209'U and 209L reside in the same vertically oriented plane As illustrated in FIG. 2, the flow directing faces 209U and 209'L are longitudinally offset from each other and the flow directing faces 209L and 290'U are longitudinally offset from each other. The faces 209U and 209'U are longitudinally aligned with the upper orifices 203U, 205U, 245U, and 247U in the valve housing sleeve 201. The faces 209L and 209'L are longitudinally aligned with the orifices 203L, 205L, 245L, and 247L in the valve housing sleeve 201.

Figure 3:
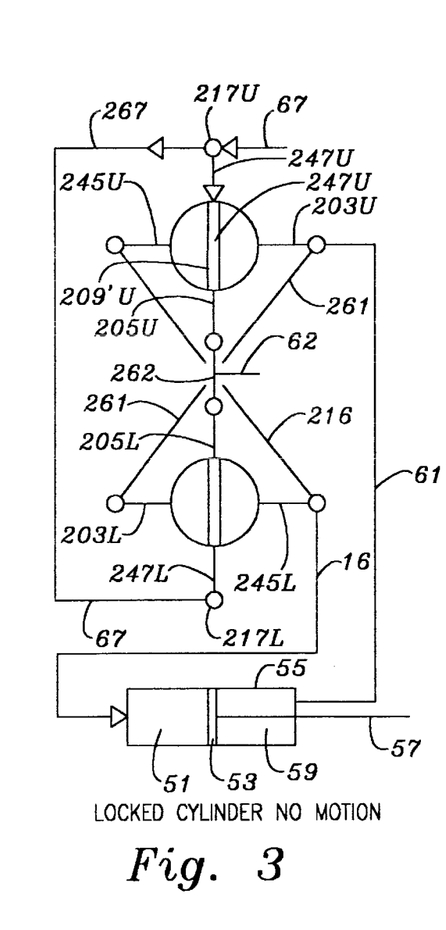
FIG. 3 is a diagrammatic view illustrating the fluid passageway interconnections of the valve of FIG. 2 with all ports blocked.
Figure 4:
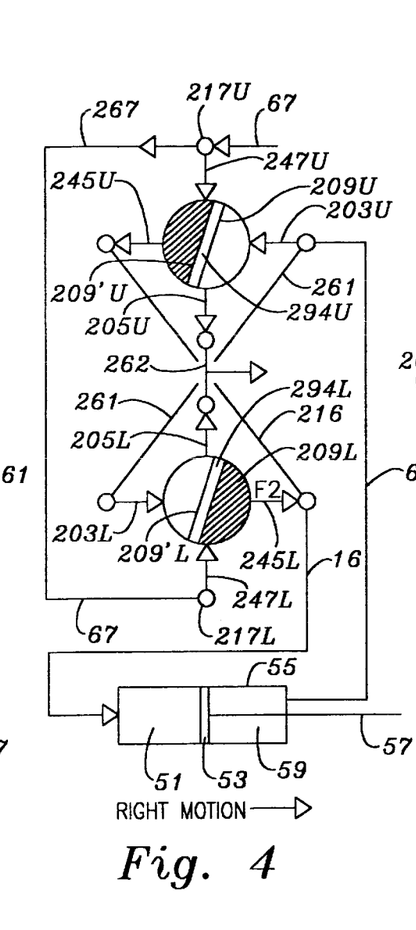
FIG. 4 is a diagrammatic view illustrating the fluid passageway interconnections of the valve of FIG. 2 responsive to rotation of the rotary valve element shown in FIG. 2 in one direction of operation.
Figure 5:
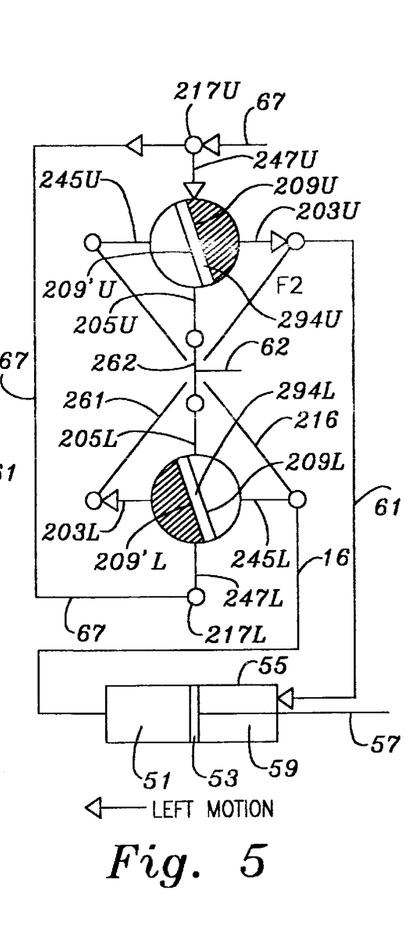
FIG. 5 is a diagrammatic view illustrating the fluid passageway interconnections of the valve of FIG. 2 responsive to actuation of the rotary valve element shown in FIG. 2 in a direction opposite to that shown in FIG. 4.

As illustrated diagrammatically in FIGS. 3, 4, and 5, the orifices in each pair of orifices are interconnected to provide alternative flow paths into and out of the valve housing sleeve 201 from opposite sides thereof. This prevents a lateral imbalance from existing in the valve housing sleeve 201.

More specifically, when a pressure is applied to one flow-directing valve face in the upper gating section 288 through the high-pressure inlet orifice 247U, an equal and diametrically opposite force is applied against one of the flow-directing faces in the lower section 288L of the movable valve gate element 207. As a consequence, equal and opposite radial forces act at all times in a lateral direction upon the movable valve gate element 207. Therefore, the movable valve element 207 is in a state of lateral equilibrium from the equal and opposite dynamic fluid forces acting upon it. This reduces the torque necessary to rotate the movable valve element 207. As a consequence, the mass of the rotary solenoid components employed in the rotary solenoid that operates the valve 200 can be reduced, thereby improving the response time of the rotary solenoid.

FIGS. 3, 4, and 5 illustrate the interconnection of the orifices in each set of orifices. In a system employing the valve 200 shown in FIG. 2 the two inlet orifices 247U and 247L are each connected to separate inlet orifice lines 217U and 217L, both of which are connected to the same high-pressure fluid supply line 67 by means of a channel, duct, or connecting line 267. Likewise, the outlet orifices 205U and 205L are both connected to the return line 62 by means of an interconnecting passage 262.

In a like manner, the pair of first fluid transfer orifices 245U and 245L are connected together by an interconnecting duct or line 216 so that both of the first fluid transfer orifices 245U and 245L are connected to the line 16 leading to the cylinder fluid cavity section 51 of the actuator cylinder 55. Likewise, both of the second fluid transfer orifices 203U and 203L are connected together by a connection line 261, so that both of the second fluid transfer orifices 203U and 203L are connected to the fluid transfer line 61 that leads to the cylinder fluid cavity section 59 of the actuator cylinder 55.

FIG. 3 illustrates the condition of the valve passageways of the valve gate element 207 relative to the orifices of the valve housing sleeve 201 when the centers of the webs 294U and 294L of the valve gate element 207 are rotated by the solenoid armature shaft is to the null or 0° position. In that position all of the inlet and outlet valve orifices are blocked by the upper web 294U and the lower web 294L of the movable valve gate element 207.

FIG. 4 illustrates the interconnection and direction of fluid flow when the movable valve gate element 207 has been rotated in a clockwise direction from the position depicted in FIG. 3. As is evident in FIG. 4, fluid flows from line 67, through connecting line 267, to fluid inlet ports 247U and 247L. Fluid then flows through the upper and lower passageways of rotatable valve element 207 to the two first fluid transfer orifices 245U and 245L, which are coupled to line 16 by connecting line 216. The fluid flow to the first cylinder fluid cavity 51 is from line 16 and the flow from the second fluid cylinder cavity 59 in the fluid actuator cylinder 55 is to the line 61. From line 61 fluid flows to second fluid transfer orifices 203U and 203L, through the valve passageways, and out of the two outlet orifices 205U and 205L, through connecting line 262, and to the reservoir through line 62. However, unlike the situation that exists when using the valve 100, in the embodiment of FIGS. 2–5, there is no lateral pressure imbalance within the valve 200, since equal and opposing laterally acting radial forces act upon the movable valve gate element 207 regardless of the pressure in the system.

The same is true in FIG. 5 which illustrates the direction of fluid flow when the armature shaft turns the rotatable valve element 207 in a counterclockwise direction from the null or 0° position. With the valve element 207 turned in the counterclockwise direction from the position of FIG. 3, as shown in FIG. 5, fluid flow is from the high-pressure supply line 67, into the inlet orifices 247U and 247L that are connected together by line 267, through the second fluid transfer valve orifices 203U and 203L, that are connected together by line 261, and to the actuator cylinder cavity 59 through line 61. Concurrently, fluid flows from the first cylinder fluid cavity 51 through line 16 to both of the first fluid transfer orifices 245L and 245U, which are interconnected by the line 216. The fluid flows out of the valve housing sleeve 201 through the outlet orifices 205U and 205L, through the connecting line 262 and on to the return line 62 leading to the reservoir.

By employing the innovative servovalve structure of the type depicted in FIGS. 2–5, the system is relieved of lateral pressure imbalances within the valve housing 201, since equal and opposite lateral force components always act on the sides of the movable valve gate element 207 from opposite radial directions. As a consequence, smaller, lighter-weight components can be utilized in the rotary solenoid actuator for the valve gate element 207, thus improving the responsiveness of the valve to changing electrical signals to the solenoid actuator.

While the laterally acting force components are balanced in the valve 200, there are still unbalanced forces acting in vertical planes that pass through and contain the axis of rotation 290 of the rotatable valve member 207. These unbalanced forces still produce a rotational bending moment on the valve member 207 in vertical planes. That is, even though the lateral components of force in the valve 200, as viewed in a direction parallel to the axis 290, are balanced, these forces act in an unbalanced manner at different locations along the longitudinal length of the valve gate member 207, as viewed perpendicular to the axis 290.

Figure 7:
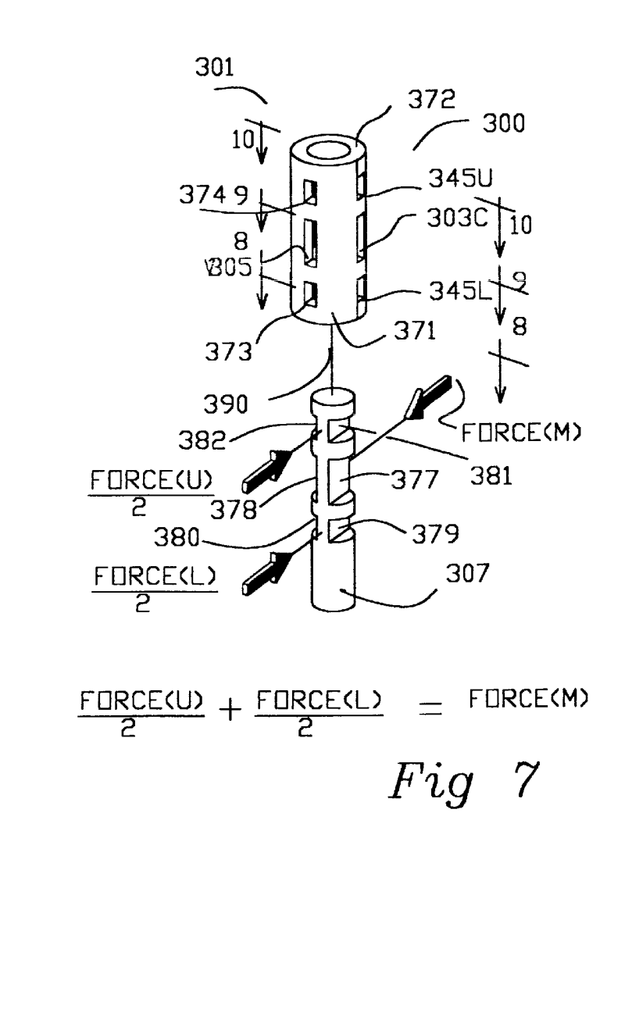
FIG. 7 is an exploded perspective view that illustrates the component valve elements of the valve shown in the system of FIG. 6

FIG. 7 illustrates a force balanced rotary valve 300 in which the forces are balanced both laterally and vertically. The valve 300 employees a hollow, cylindrical, annular valve housing 301 and a rotatable valve closure or gating element 307 located coaxially within the confines of the valve housing 301. The valve housing 301 has a longitudinal axis 390 and first and second opposite ends 371 and 372, respectively. The valve housing 301 defines a central, radial inlet port 347 therein, which is visible in FIG. 9. A central radial outlet port 305 is also defined in the wall of the valve housing 301 diametrically opposite the central inlet port 347. The central inlet port 347 and the central outlet port 305 both have a rectangular shape and are equal in area to each other.

The valve housing 301 also has first and second end radial inlet ports 373 and 374, respectively. The ports 373 and 374 are respectively located in the first end 371 and in the second end 372 of the valve housing 301. The end radial inlet ports 373 and 374 are in angular alignment with each other and with the central outlet port 305. The end inlet ports 373 and 374 are longitudinally displaced equidistantly from the central outlet port 305 in a direction parallel to the valve axis 390.

The valve housing 301 also has first end and second end radial outlet ports 375 and 376, located, respectively, in the first end 371 and in the second end 372 of the valve housing 301. The end outlet ports 375 and 376 are in angular alignment with each other and with the central inlet port 347. The end outlet ports 375 and 376 are longitudinally displaced equidistantly from the central inlet port 347 in a direction parallel to the valve axis 390. Each of the first and second end inlet and outlet ports 373,374,375, and 376 has an area one half the area of each of the central ports 305 and 347.

The valve closure element 307 also differs from the valve closure element 207. The valve closure or gating element 307 defines a pair of central passages 377 and 378 therethrough, a pair of first end transverse passageways 379 and 380 therethrough, and a pair of second end transverse passageways 381 and 382 therethrough. The central transverse passageways 377 and 378 are longitudinally aligned with the central ports 347 and 305 in the valve housing 301. The first end transverse passageways 379 and 380 are longitudinally aligned with the first end ports 373 and 375 in the valve housing 301. The second end transverse passageways 381 and 382 are longitudinally aligned with the second end ports 374 and 376 in the valve housing 301.

The first end passageways 379 and 380 and the second end passageways 381 and 382 are each of a cross-sectional area one half that of each of the central passageways 377 and 378. All of the passageways 377, 378, 379, 380, 381, and 382 are parallel to each other. They also extend in a transverse direction so that, as the valve closure element 307 rotates within the valve housing 301, it concurrently brings the central passageways 377 and 378 into alignment with both of the central ports 347 and 305, the first end passageways 379 and 380 into alignment with both of the first end ports 373 and 375, and the second end passageways 381 and 382 into alignment with both of the second end ports 374 and 376.

Because the areas of the end ports and end passageways are each one half of the area of the central ports and central passageways, the forces acting upon the rotatable valve element 307 are always in balance in planes passing through and containing the valve axis 390. The end ports 373, 374, 375, and 376 in the valve housing 301 are all located equidistant from the central ports 305 and 307 therein. The end passageways 379, 380, 381, and 382 in the rotatable valve element 307 are also equidistant from the central passageways 377 and 378. Therefore, there is no bending moment applied to the rotatable valve element 307 along its length even though there may be very large pressure differentials between the fluid inlet and fluid outlet sides of the valve 300.

Figure 6:
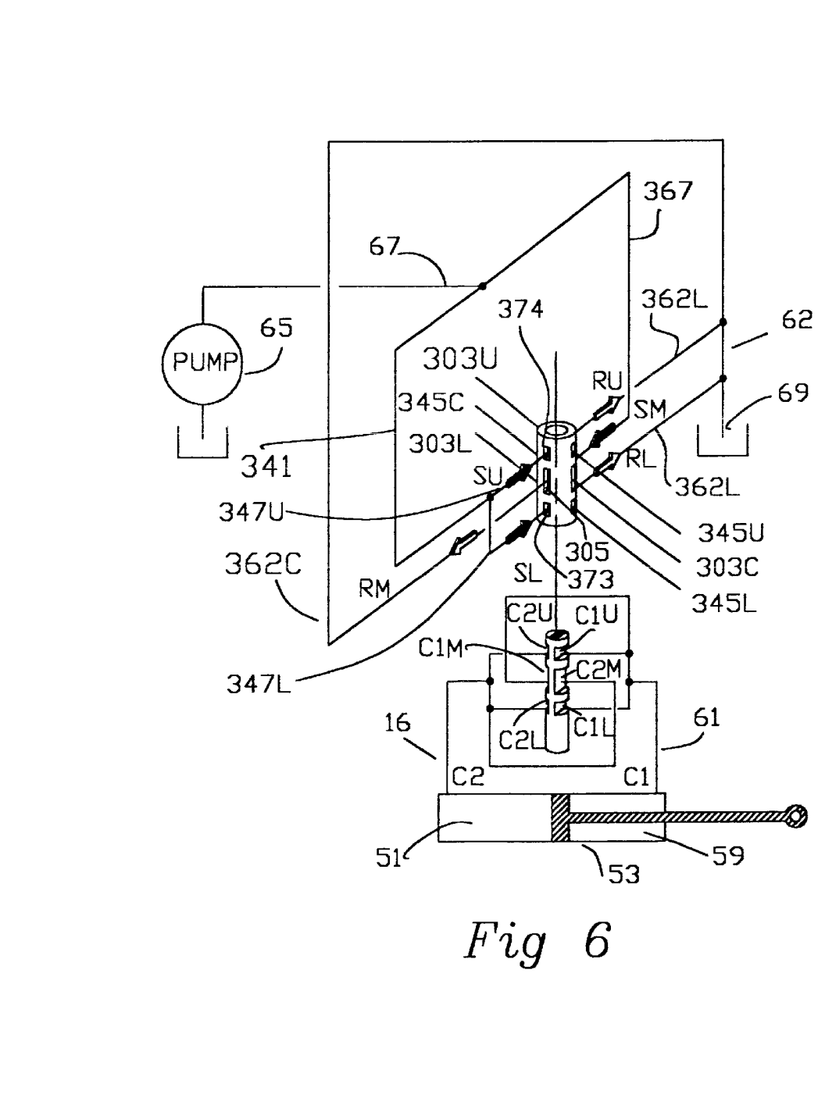
FIG. 6 is a diagrammatic perspective view of a fluid flow control system employing a further preferred embodiment of the rotary servovalve of the invention having certain advantages over the embodiment depicted in FIGS. 1–5 and shown actuated to permit fluid flows as illustrated by directional arrows.

From FIG. 7 it can be seen that the inlet force (M) that is applied at the central inlet port 347 from the pump 65 acting through lines 67 and 367, as shown in FIG. 6, is in a direction opposite both the force (U) which is acting through the second, upper end inlet port 374 and the force (L) acting through the lower, first end inlet port 373. The forces (U) and (L) are generated by pressure from a pump 65 acting through lines 67 and 341 and through lines 347U and 347L, respectively. The pressure in each of the lines 367, 347U, and 347L is, of course, the same, because those lines are all in direct fluid communication with each other. Since the area of the central inlet port 347 is twice the area of each of the end inlet ports 373 and 374, the force (M) is equal and opposite to the combined forces (U) and (L). Moreover, since the end inlet ports 373 and 374 are located equidistant from the central inlet port 347 parallel to the axis 390, the bending moment created by the force (U) is in a direction equal and opposite to the bending moment created by the force (L). Therefore, the valve 300 is in balanced force equilibrium not only in a lateral direction, but also in planes passing through and containing the longitudinal axis of rotation 390 of the rotatable valve element 307.

Fluid flow through the valve 300 is illustrated in the system diagram shown in FIG. 6. When the rotatable valve element 307 is rotated by the solenoid in one direction, fluid under pressure flows from the primary high pressure inlet line 67, through the branch inlet lines 341 and 367 and from inlet lines 367, 347U, and 347L to the inlet ports 347,374, and 373, respectively. The force SM which acts at inlet port 347 is in a direction equal and opposite to the sum of the forces SU and SL which act at ports 374 and 373, respectively. From these inlet ports, fluid flows into the transverse valve passageways.

Figure 8:
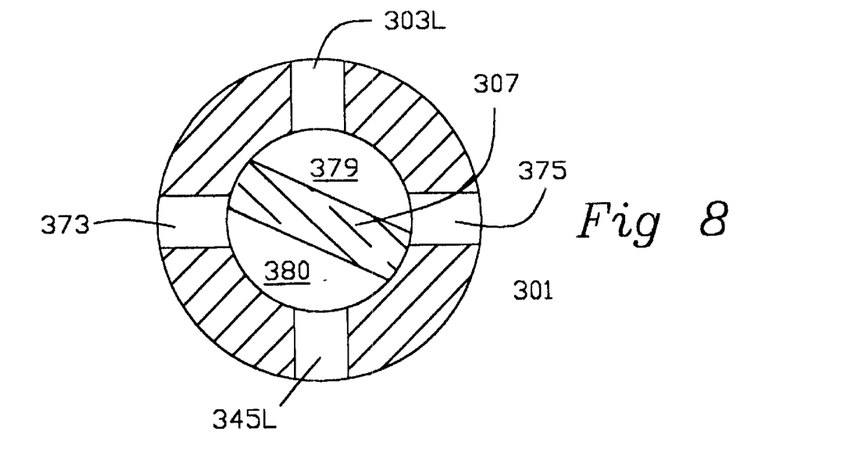
FIG. 8 is a plan sectional view of the assembled valve of FIG. 7 taken along the lines 8—8 in FIG. 7.
Figure 9:
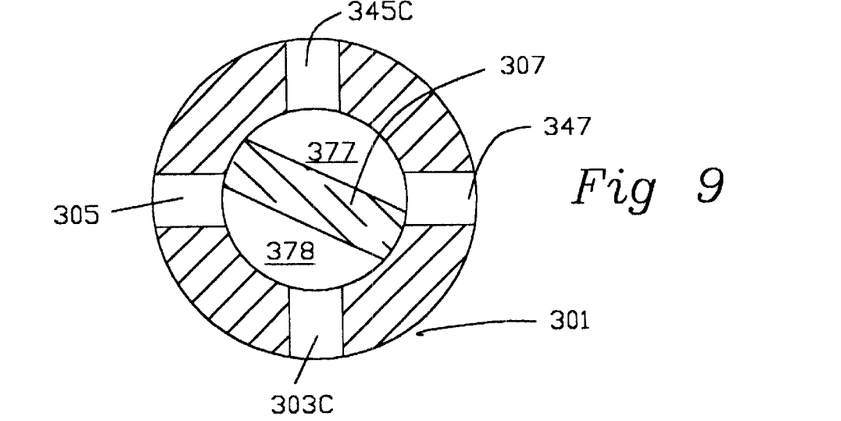
FIG. 9 is a plan sectional view of the assembled valve of FIG. 7 taken along the lines 9—9 in FIG. 7.
Figure 10:
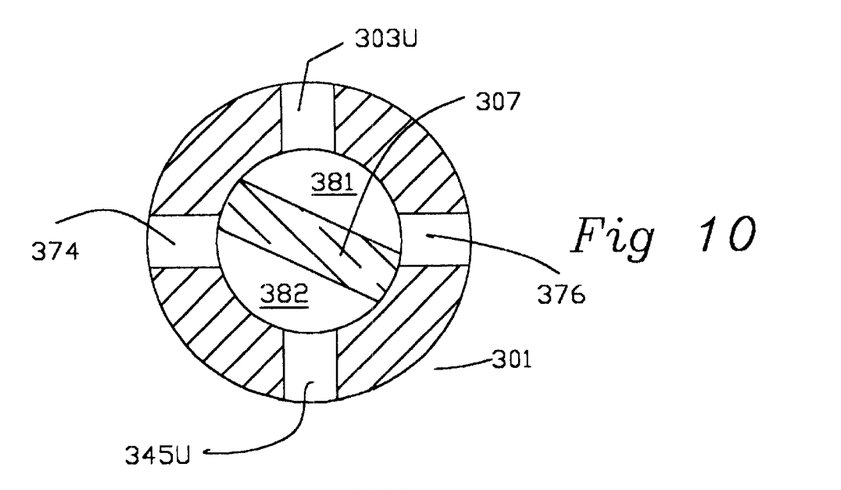
FIG. 10 is a plan sectional view of the assembled valve of FIG. 7 taken along the lines 10—10 in FIG. 7.

If the rotatable valve element 307 is turned from the null position in a clockwise direction, as illustrated in FIGS. 8, 9, and 10, flow will be from the inlet ports 347, 374 and 373 into passageways 377, 380 and 382, respectively. From these passageways fluid flow is to the first fluid transfer ports 345C, 345U, and 345L, respectively. From these fluid transfer control ports fluid respectively flows into control lines C2M, C2U, and C2L, respectively, and then into control line 16 leading to port C2 at the blind end 51 of the hydraulically actuated cylinder 55.

Concurrently, fluid flows from the cylinder actuator end 59 through port C1 thereof to line 61. From control line 61 fluid flows through lines C1M, C1U, and C1L to control ports 303C, 303U, and 303L, respectively. Fluid then flows from control port 303C through passageway 378 to relief port 305, and on to relief lines 362C and 62 to the reservoir 49. At the same, time fluid flows from control port 303U through passageway 381 to relief port 376 and on to relief lines 362U and 62 to the reservoir 49, and from control port 303L through passageway 379 to relief port 375 and on to relief lines 362L and 62 to the reservoir 49. The force RM that exists at port 305 is equal and opposite to the sum of the forces RU and RL that exist at ports 376 and 375, respectively.

If the valve element 307 is rotated in the opposite, counterclockwise direction from the null point, flow through the control ports 303U, 345U, 303C, 345C, 303L, and 345L and through control lines 16 and 61 will be in the opposite directions from those shown in FIGS. 6–10.

Undoubtedly, numerous variations and modifications of the invention will become readily apparent to those familiar with sensitive, high-pressure, rapid acting fluid control valves. Accordingly, the scope of the invention should not be construed as limited to this specific embodiments depicted and described herein, but rather is defined in the claims appended hereto.

I claim:

1. In a rotary valve including a hollow, cylindrical housing defining a longitudinal axis and having inlet and outlet ports defined therethrough and a valve core of a cylindrical configuration having transverse passageways defined therethrough and rotatably mounted within said valve housing, the improvement wherein said ports are aligned on said valve housing and said passageways are alignable with said ports by rotation of said valve core within said housing so that rotational bending moments upon said valve core produced by fluid pressure in said passageways are balanced at all times and wherein said valve housing and said valve core both have first and second ends, and said ports are comprised of a first end inlet port, a second end inlet port, a central inlet port, a first end outlet port, a second end outlet port, and a central outlet port; and said end inlet and outlet ports are each equal in area to each other and are each half the area of each of said central ports, and said first end inlet port, said central outlet port and said second end inlet port are angularly aligned with each other and said central outlet port lies midway between said end inlet ports in a longitudinal direction, and said first end outlet port, said central inlet port and said second end outlet port are angularly aligned with each other and said central inlet port lies midway between said end outlet ports, and said first and second end inlet ports are angularly displaced 180 degrees from said first and second end outlet ports and said central inlet port is angularly displaced 180 degrees from said central outlet port.

2. A rotory valve according to claim 1 wherein said first and second end inlet ports are respectively located diametrically opposite said first and second end outlet ports.

3. A force balanced rotary valve comprising:
   a hollow cylindrical valve housing having a longitudinal axis and first and second opposite ends and defining a central radial inlet port therein and a central radial outlet port therein equal in area to each other and located in axial alignment and one hundred eighty degrees in angular displacement from each other, first end and second end radial inlet ports respectively located in said first and second ends of said valve housing in angular alignment with each other and with said central outlet port and longitudinally displaced equidistantly from said central outlet port, and first end and second end radial outlet ports respectively located in said first and second ends of said valve housing in angular alignment with each other and with said central inlet port and axially displaced equidistantly from said central inlet port, and each of said first and second end inlet and outlet ports has an area half that of each of said central ports, and a valve closure element of cylindrical configuration rotatably mounted within said valve housing and defining central, first end and second end transverse passages therethrough which are respectively longitudinally aligned with said central ports, said first end ports, and said second end ports, and said first end passageways and said second end passageways are each of a cross-sectional area one-half that of each of said central passageways, and said passageways extend in a transverse direction.

4. A valve according to claim 3 wherein said passageways are straight and parallel to each other.

5. A valve according to claim 4 wherein each of said ports has a rectangular shape and all of said ports are of equal angular width.

6. A rotory valve comprising:

a hollow cylindrical valve housing having a longitudinal axis and first and second opposite ends and defining a central inlet port and a central outlet port equal in area to each other and longitudinally aligned and angularly displaced one hundred eighty degrees from each other, a first end inlet port and a first end outlet port equal in area to each other and each equal to half the area of each of said central ports and longitudinally aligned and angularly displaced one hundred eighty degrees from each other and located in said first end of said valve housing at a longitudinal offset distance from said central ports, a second end inlet port and a second end outlet port equal in area to each other and each equal to half the area of each of said central ports and longitudinally aligned and angularly displaced one hundred eighty degrees from each other and located in said second end of said valve housing at said same longitudinal offset distance from said central ports, and a valve core of cylindrical configuration rotatably mounted within said valve housing and having central, first end, and second end passageways defined therethrough which are respectively longitudinally aligned with said central, first end and second end ports, and said first end and second end passageways each have a cross-sectional area half that of said central passageway, and said passageways are oriented so as to provide concurrent fluid flow through said passageways through all of said ports when said valve core is rotated to an open position within said valve housing and so as to concurrently block all of said passageways when said valve core is rotated to a closed position within said valve housing.

7. A rotory valve according to claim 6 wherein all of said ports are of equal angular width and have a rectangular shape.

8. A rotory servovalve comprising:

a fluid transfer valve housing having a wall of annular cross section and a plurality of fluid inlet ports coupled to a common fluid inlet line, a plurality of fluid outlet ports coupled to a common fluid outlet line, a plurality of first fluid control ports coupled to a common first fluid control line, and a plurality of second fluid control ports coupled to a common second fluid control line, and at least two of said inlet ports are angularly displaced from each other by one hundred eighty degrees and are longitudinally offset from each other in said housing, at least two of said outlet ports are angularly displaced from each other by one hundred eighty degrees and are longitudinally offset from each other in said housing, at least two of said first fluid control ports are angularly displaced from each other by one hundred eighty degrees and are longitudinally offset from each other in said housing, and at least two of said second fluid control ports are angularly displaced from each other by one hundred eighty degrees and are longitudinally offset from each other in said housing, and said inlet and outlet ports are each angularly displaced from said control ports by ninety degrees.

9. A rotory servovalve comprising:

a valve housing of a cylindrical shape and having a valve cavity of circular cross section defined therewithin and defining at least two rectangular inlet ports to said valve cavity, and at least one of said fluid inlet ports is angularly offset one hundred eighty degrees from at least one other of said fluid inlet ports, at least two rectangular outlet ports from said valve cavity and at least one of said fluid outlet ports is angularly offset one hundred eighty degrees from at least one other of said fluid outlet ports, and at least two first rectangular fluid control ports in communication with said valve cavity and at least one of said first fluid control ports is angularly offset one hundred eighty degrees from at least one other of said first fluid control ports, and at least two second rectangular fluid control ports in communication with said valve cavity and at least one of said second control ports is angularly offset one hundred eighty degrees from one other of said second fluid control ports and said first and second fluid control ports are all angularly offset equidistantly from all of said inlet and outlet ports, a bidirectional valve closure element having a gate portion with at least two pairs of two mutually parallel, flow directing faces of rectangular shape, and said pairs of flow directing faces are longitudinally offset from each other and are longitudinally aligned with said ports and said flow directing faces in each pair are longitudinally aligned with each other and laterally spaced from each other, whereby pairs of longitudinally offset parallel flow paths are established through said valve housing and through said gate portion of said valve closure element, and said valve closure element is located within said valve cavity and is coaxially aligned and rotatable therewithin to, in the alternative: (1) permit concurrent fluid flow therethrough in opposite directions within each pair of mutually parallel flow paths, and (2) concurrently block all of said inlet ports and all of said outlet ports.

10. In a rotory servovalve system in which fluid is directed through an inlet port, an outlet port, a first fluid control port, and a second fluid control port in a valve housing as directed by a movable valve gate element rotatable within said housing in opposite directions of angular rotation from a position prohibiting fluid flow through any of said ports to alternative positions permitting fluid flow in alternative opposite directions through each of said first and second fluid control ports, the improvement comprising a plurality of each of said ports as aforesaid, and at least two of said inlet ports are located on opposite sides of said valve housing from each other, at least two of said outlet ports are located on opposite sides of said valve housing from each other, at least two of said first fluid control ports are located on opposite sides of said valve housing from each other, and at least two of said second fluid control ports are located on opposite sides of said valve housing from each other, and said ports are located in said valve housing such that offsetting bending forces are created on said movable valve element by fluid pressure within said valve.

* * * * *